United States Patent
Chang

(10) Patent No.: US 6,861,780 B2
(45) Date of Patent: *Mar. 1, 2005

(54) MOTOR'S STATOR FOR A HOUSEHOLD FAN

(76) Inventor: Fang-Fu Chang, 3F, No. 275, Neihu Rd., Sec. 1, Neihu, Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 10/419,828

(22) Filed: Apr. 22, 2003

(65) Prior Publication Data

US 2004/0027026 A1 Feb. 12, 2004

(30) Foreign Application Priority Data

Aug. 8, 2002 (CN) .......................................... 02266141 U

(51) Int. Cl.⁷ ................................................. H02K 1/00
(52) U.S. Cl. ........................................................ 310/216
(58) Field of Search .................................. 310/216, 254

(56) References Cited

U.S. PATENT DOCUMENTS 6,127,759 A * 10/2000 Tanaka et al. ............... 310/233
6,191,509 B1 * 2/2001 Yura et al. ................. 310/49 R

FOREIGN PATENT DOCUMENTS

JP 408294254 * 11/1996 .......... H02K/17/08

* cited by examiner

Primary Examiner—Tran Nguyen
(74) Attorney, Agent, or Firm—Troxell Law Office PLLC

(57) ABSTRACT

The invention relates to a motor's stator for a household fan whose silicon steel sheets have an enlarged middle hole for increasing from 16 slots to 24 slots along the circumference of the middle hole. Accordingly, the number of poles is increased from four to six so as to form a six-pole motor that upgrades the revolutions and torsion. In addition, the enlargement of the middle hole can correspondingly diminish the whole area of the slots so that the number of turns in the slots can be lowered. Meanwhile, the material cost is reducible, the temperature rise is suppressible and the efficiency is enhancable.

2 Claims, 4 Drawing Sheets

MOTOR'S STATOR FOR A HOUSEHOLD FAN

BACKGROUND OF THE INVENTION

1. Field of the Invention

The invention relates to a motor's stator for a household fan, and more particularly, to an improved motor's stator design with less coils, more torsion output and increased output efficiency.

2. Description of the Related Art

Conventional household fans employ a squirrel-cage rotor's motor as power source. As shown in FIG. 1, the stator 30 of this squirrel-cage rotor's motor is formed by stacking up a plurality of silicon steel sheets 3 with the dimension of 75 mm×75 mm. Meanwhile, the stator 30 includes a large hole 31 in the center thereof for receiving a rotor 5 with diameter of 44 mm. A plurality of slots 32, around which a coil 4 is wound, is provided along the circumference of the middle hole 31. After the stator 30 and the rotor 5 are assembled (see FIG. 2), the rotor is received within the middle hole 31 of the silicon steel sheets 3 and located at a clearance of 0.7±0.05 mm to the internal circumference of middle hole 31. After the current flows through the coil 4, a magnetic field is created to bring the rotor 5 into rotation. At the same time, the fan's blades are revolved. And the above-mentioned is a commonly used four-pole motor with sixteen slots 32. However, reasons for high temperature created during the rotational operation of the household fans lie in the large resistance of the copper wire, the magnetic resistance loss due to the clearance between the rotor and the stator and the iron loss due to the division of the partition magnetic field. Besides, these factors would lead to an adverse effect on the output efficiency of the motor.

In order to avoid the above drawbacks, a Taiwanese Utility Model Application (TW 89201451) discloses a structure of a motor's stator for a household fan in which the stator in form and configuration is improved. The middle hole of the stator is enlarged to 48 mm for accommodating a rotor with larger diameter. Accordingly, the actuation current, the operational temperature, the weight and the production cost are all reducible. In practice, the optimal revolutions are 950 rpm which is much lower than the above-mentioned four-pole motor with 1600 rpm, and the greater revolutions always cause trouble in application and design. Under the restriction of the number of the slots 32 of the four-pole motor's stator and their clearance, a desired torsion can't be reached. The rotation speed is always reduced or a problematic rotation easily occurs under influence of external forces (e.g. an adverse wind). All of these are also disadvantages of the TW 89201451.

SUMMARY OF THE INVENTION

It is a primary object of the invention to remove the above-mentioned drawbacks and to provide a motor's stator for a household fan whose silicon steel sheets have an enlarged middle hole for arrange more slots along the circumference of the middle hole. Accordingly, the number of poles can be increased to six so as to form a six-pole motor that upgrades revolutions and torsion thereof.

It's another object of the invention to provide a motor's stator whose slots around the enlarged middle hole occupy less space so that the number of turns in the slots can be lowered. Meanwhile, the material cost is reducible, the temperature rise is suppressible and the efficiency is enhancable.

BRIEF DESCRIPTION OF THE DRAWINGS

The accomplishment of this and other objects of the invention will become apparent from the following description and its accompanying drawings of which.

DETAILED DESCRIPTION OF THE PREFERRED EMBODIMENT

Figure 1:
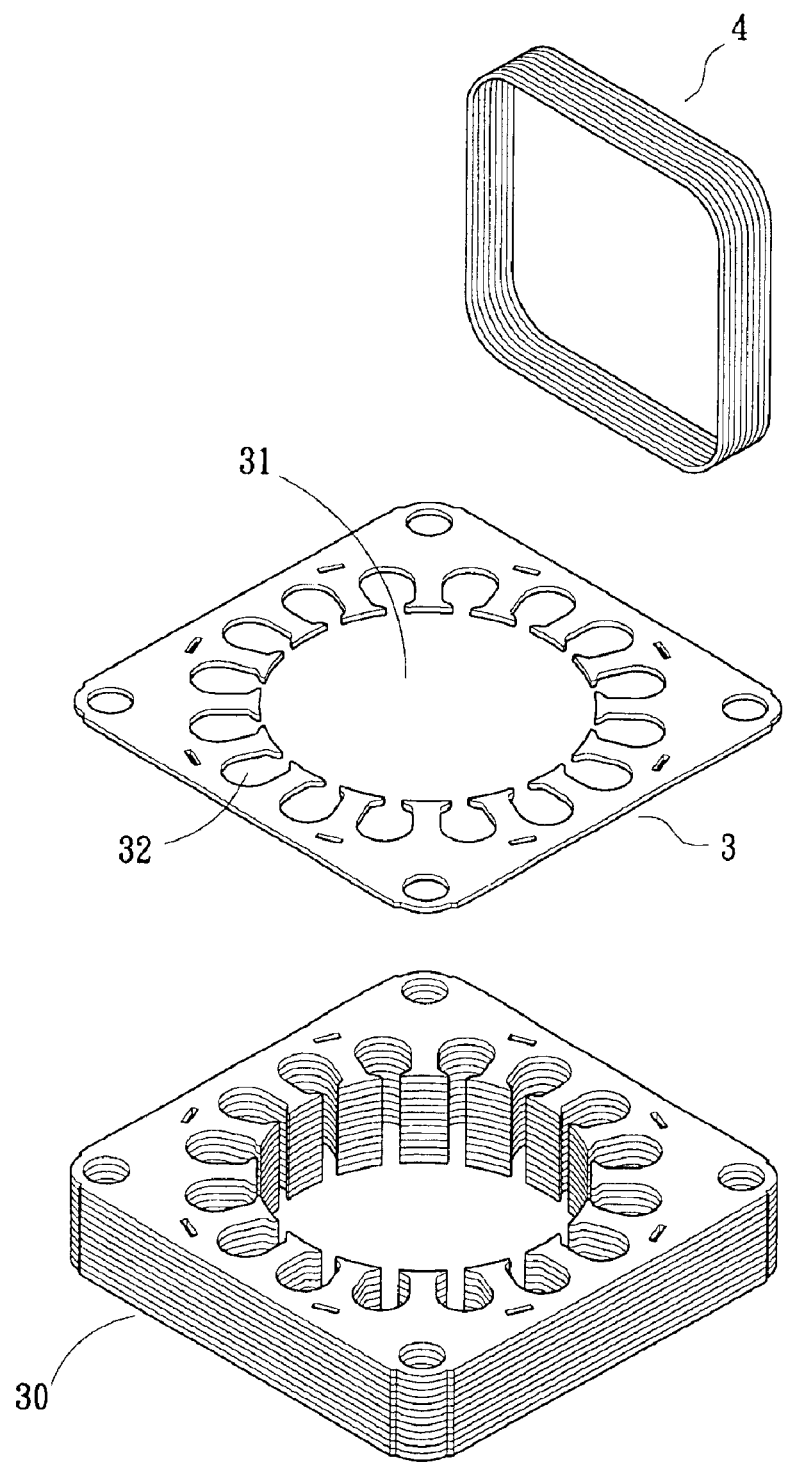
FIG. 1 is a perspective exploded view of a conventional motor's stator.
Figure 2:
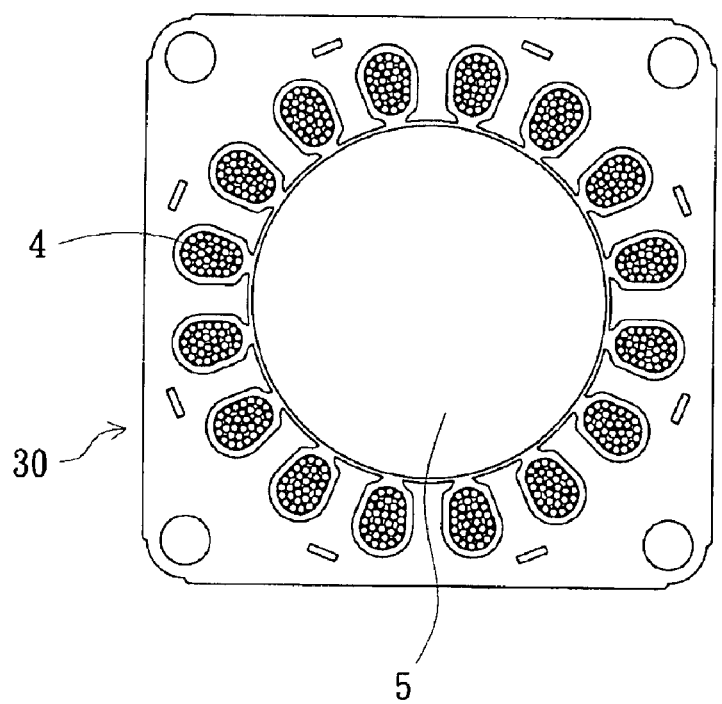
FIG. 2 is a plan view of the stator and the rotor of FIG. 1 in assembled state.
Figure 3:
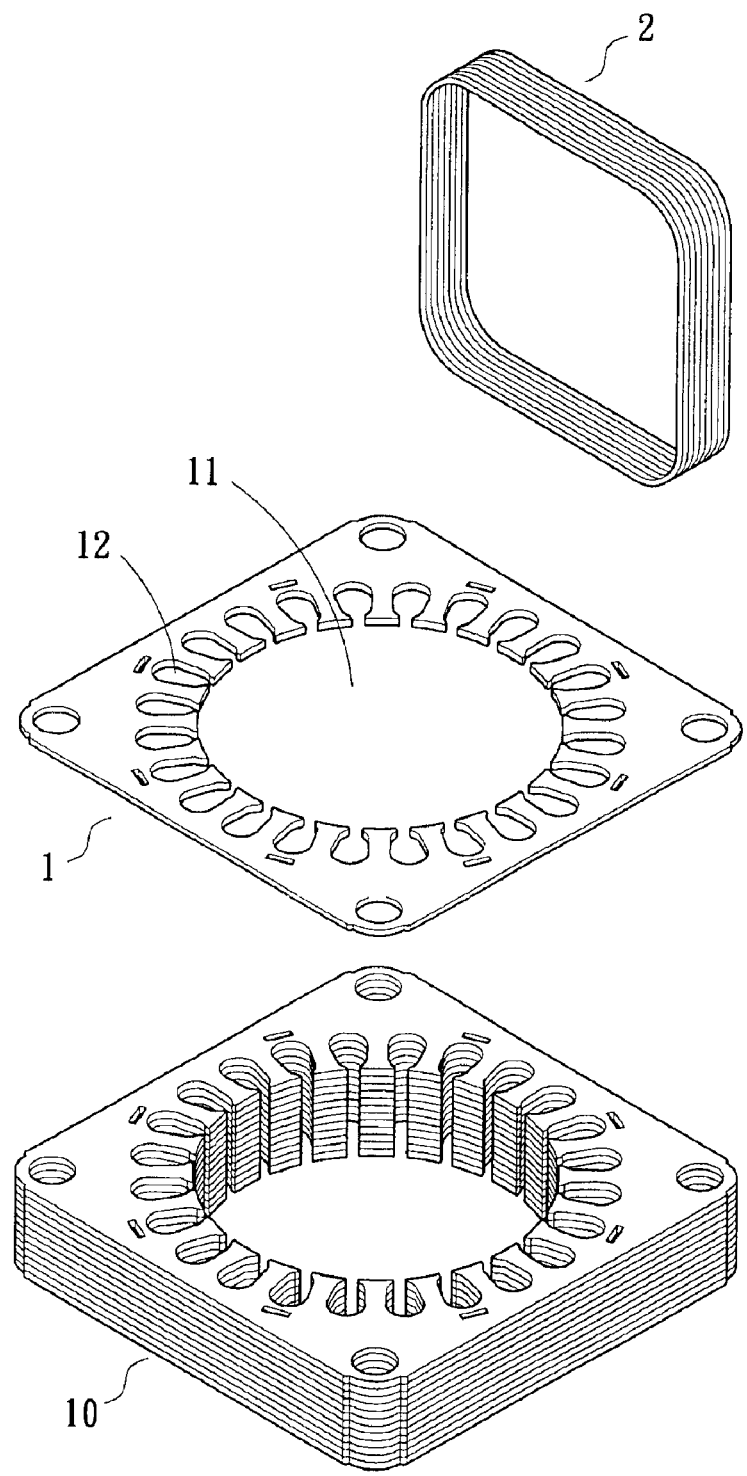
FIG. 3 is a perspective exploded view of the motor's stator in accordance with the invention.
Figure 4:
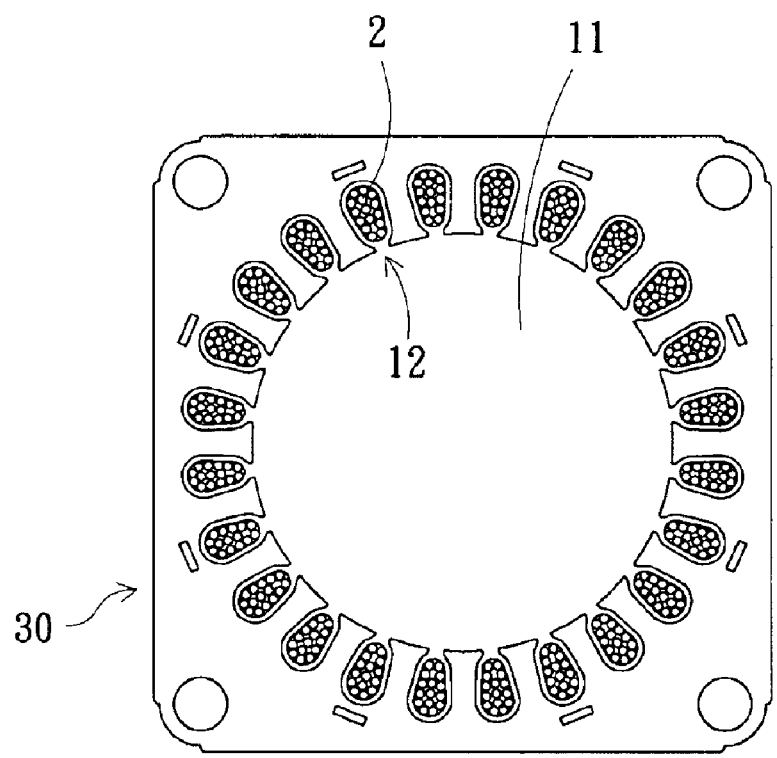
FIG. 4 is a plan view of the stator and the rotor in accordance with the invention in assembled state.

First of all, referring to FIG. 3, a preferred embodiment of the invention includes a stator 10 and a coil 2. The stator 10 is formed by means that a plurality of silicon steel sheets 1 is stacked up. The silicon steel sheets 1 each have a middle hole 11 and twenty-four slots 12 which are evenly distributed around the internal circumference of the middle hole 11 and serve to accommodate the silicon steel sheets 1, thereby forming a six-pole motor's stator.

The output torque of motor is proportional to the square of the external diameter of a motor's rotor (or the middle hole 11 of the silicon steel sheets 1). Accordingly, the stator in accordance with the invention employs more slots 12 at the same clearance to each other for enlarging the inner diameter of the middle hole 11 and receiving a rotor 5 with greater outer diameter. Therefore, the motor in accordance with the invention is capable of creating a greater torque. Meanwhile, the depth of the slots 12 of the silicon steel sheets 1 can be lowered due to the enlargement of the middle hole 11, thereby minimizing the number of turns in the slots and the consumption of copper wire. Thus, the material cost is reduced.

After empirical research, it turns out that an optimal rotation is reached supposed that the dimension of the silicon steel sheets 1 amount to 75 mm (±1 mm) in length and 75 (±1 mm) in width and the inner diameter of the middle hole 11 amounts to 50 mm (±1 mm).

Many changes and modifications in the above-described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A stator for a six-pole motor for a household fan comprising:
   a) a stator having a plurality of stacked silicon steel sheets, each of the plurality of stacked silicon steel sheets having:
      i) a middle hole for accommodating a rotor; and
      ii) twenty-four slots evenly distributed around and extending outwardly from an outer circumference of the middle hole; and
   b) a coil extending through the slots of the plurality of stacked silicon steel sheets, wherein a diameter of the middle hole is 50 mm±1 mm.

2. The stator according to claim 1, wherein each of the plurality of stacked silicon steel sheets has a length of 75 mm±1 mm and a width of 75 mm±1 mm.

* * * * *